No. 794,164.

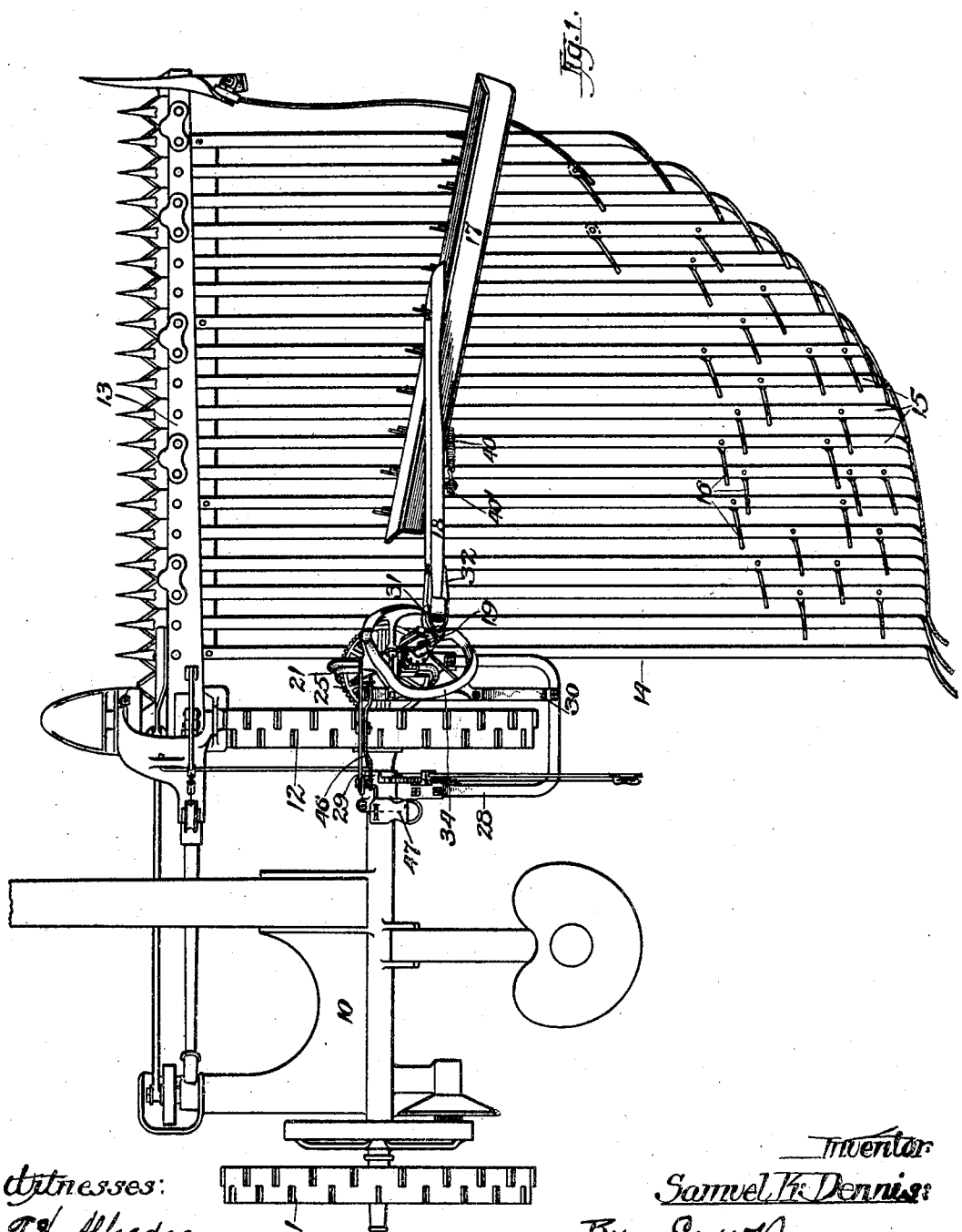

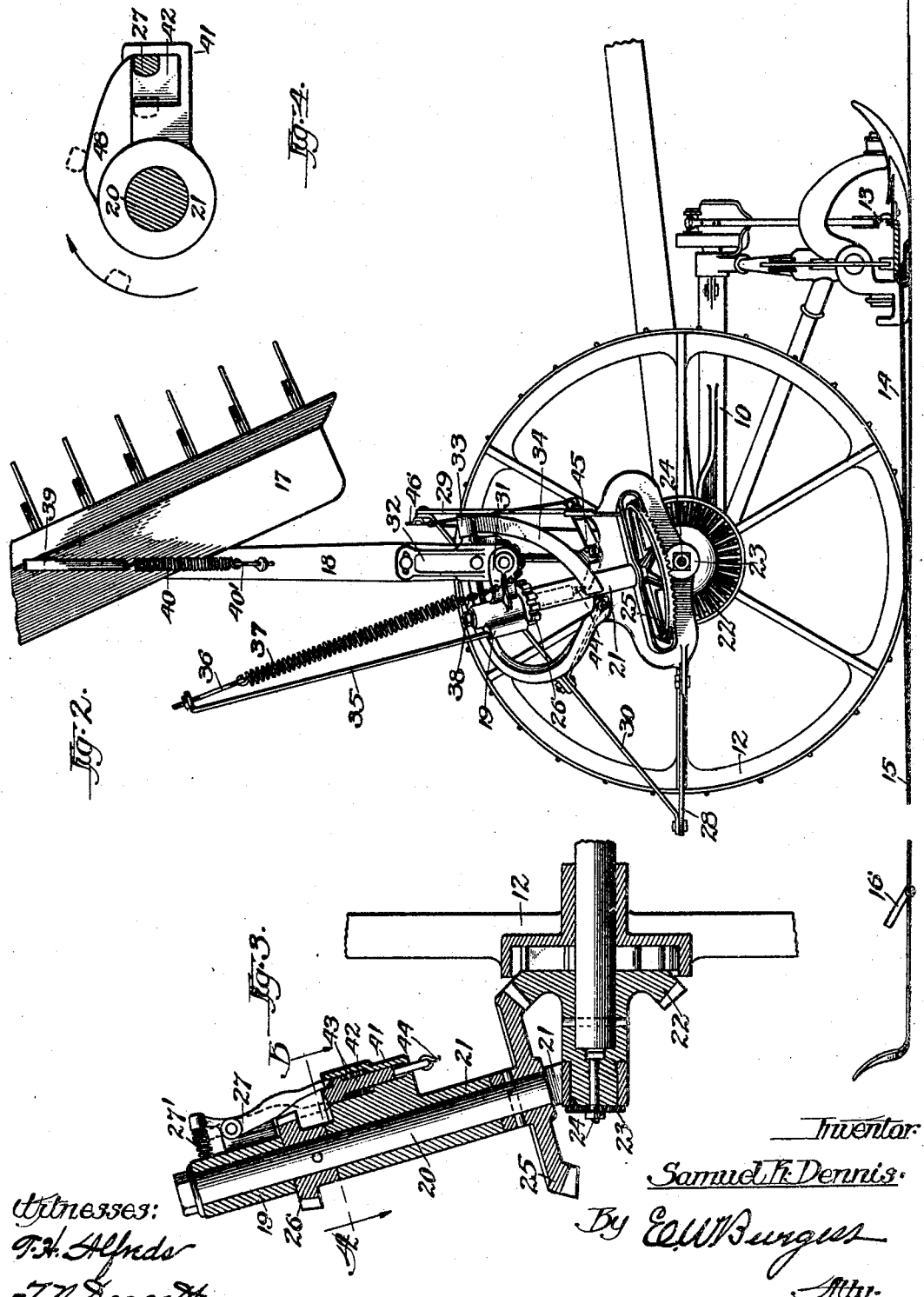

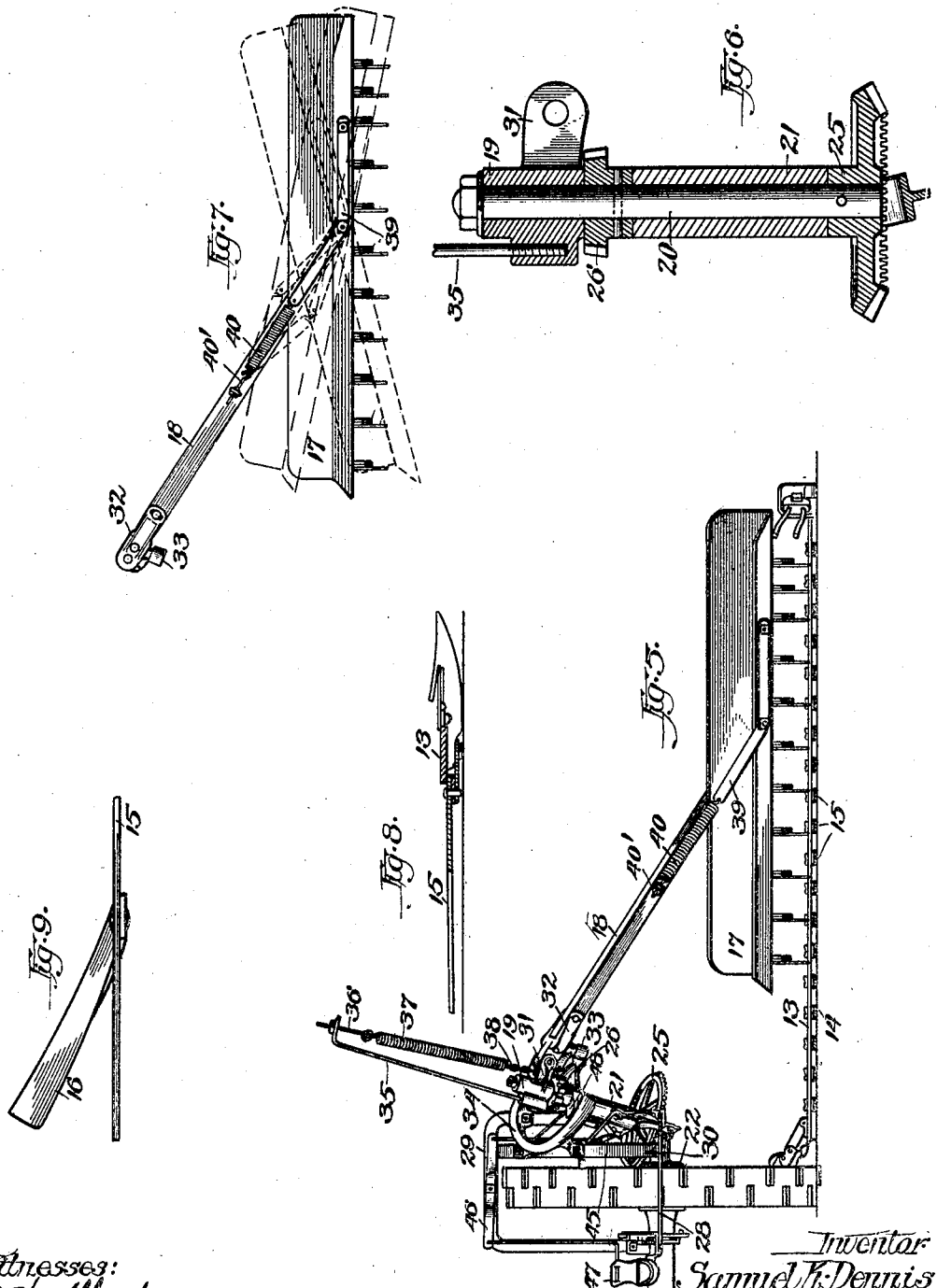

Patented July 11, 1905.

UNITED STATES PATENT OFFICE.

SAMUEL K. DENNIS, OF CHICAGO, ILLINOIS, ASSIGNOR TO INTERNATIONAL HARVESTER COMPANY, A CORPORATION OF NEW JERSEY.

CLOVER-BUNCHER.

SPECIFICATION forming part of Letters Patent No. 794,164, dated July 11, 1905.

Application filed March 6, 1905. Serial No. 248,640.

*To all whom it may concern:*

Be it known that I, SAMUEL K. DENNIS, a citizen of the United States, residing at Chicago, in the county of Cook and State of Illinois, have invented certain new and useful Improvements in Clover-Bunchers, of which the following is a specification, reference being had to the accompanying drawings, forming a part thereof.

My invention relates to clover-buncher attachments for mowers wherein a trailing slatted platform is attached to the rear side of the cutter-bar to receive the cut grass and from which it is delivered to one side behind the body of the machine by a sweep-rake mounted thereon, the object of the invention being to provide an attachment of the character described that will collect and retain a large amount or bunch of grass without littering and to deposit it at a distance to one side great enough to leave a clear path for the draft-animals on the succeeding round, to improve the construction of the slatted platform for the purpose of preventing as much as possible all tendency of the collecting means to thresh out the seed, and to improve the construction of the sweep-rake mechanism whereby it is free to follow any undulating movement of the platform by means of its yielding connection. I attain these objects by the mechanism shown by the drawings and described in the specification accompanying this application, in which—

Figure 1 is a top plan view of a mower with my clover-buncher attached thereto. Fig. 2 is a grass-side view of Fig. 1. Fig. 3 is a detail of the rake-driving mechanism. Fig. 4 is a detail of part of the rake-tripping mechanism on line A B of Fig. 3. Fig. 5 is a rear view of a part of Fig. 1. Fig. 6 is another detail of part of the rake-driving mechanism. Fig. 7 is a detail of the rake and its supporting-arm, and Figs. 8 and 9 are details of the slatted platform and connections.

Like numerals represent the same parts.

10 represents the frame of a mower; 11, the stubbleward road-wheel, and 12 the grassward; 13 the cutter-bar, adapted to float upon the ground in the well-known manner and may be connected to the wheel-frame by any of the well-known means provided to secure that result.

14 represents a platform that is connected with the rear side of the cutter-bar and adapted to trail upon the ground and receive the cut crop thereon. The platform is made of flat steel bars 15, gradually increasing in length from the grassward to the stubbleward end of the cutter-bar and forming what is usually called a "quadrant-shaped" platform. The bars are placed a distance apart and have their rear ends curved upward and laterally toward the stubbleward side. As so far described it is one having a common form.

In the operation of attachments of the above type the grass as cut falls upon the trailing platform, and the stubble protruding upward between the slats carries it rearward until it reaches the upturned ends of the slats, where it is held until delivered therefrom, and it has been found that the constant scrubbing action of the stubble upon the bottom of the accumulating bunch operates to thresh out a large amount of the seed, which is objectionable. To provide a remedy for the above-noted evil, I have provided the slats or trailing bars with what may be called "barbs" 16, that are rearwardly and stubblewardly inclined. The barbs need not be applied to all of the slats, and I prefer to arrange them promiscuously at the rear end of the platform, as shown in Fig. 1. I prefer to make them of flat steel and secure them to the bars by means of a rivet, as shown in Fig. 9. They operate to raise the accumulating bunch and prevent the scrubbing action of the stubble referred to and also to prevent the movement of the bunch stubbleward and off from the platform and consequent littering between the deposited bunches. To deliver the accumulated bunch from off the platform, a sweep-rake 17 is provided that is yieldingly connected to an arm 18, that is pivotally connected to a revolving head 19. The head 19 is mounted loosely upon the upper end of an inclined shaft 20, that is journaled in a bracket 21. Upon the extended end of the main drive-shaft, outside of the drive-wheel 12, is secured a bevel-wheel 22, having its inner face provided with driving means adapted to coact with other driving means carried by the drive-wheel to drive the main shaft in any of the usual ways. The bracket 21 is journaled upon the extended end of the hub of the bevel-wheel 22 and is held thereon by means of the washer 23 and bolt 24. Secured to the lower end of the shaft 20 is a bevel-wheel 25, that meshes with and is driven by the bevel-wheel 22. Secured to the shaft 20, between the head 19 and the bracket 21, is a toothed wheel 26, and pivoted upon the head 19 is a spring-actuated lever 27, adapted to engage with the toothed wheel 26 in a manner to be described later. The bracket 21 is further supported by a U-shaped frame member 28, secured to the main frame of the mower and having its legs upon opposite sides of the rear half of the drive-wheel 12, and also by a U-shaped member 29, similarly secured and extending above the drive-wheel and having a brace 30 joining the two members, as shown in Fig. 1.

The head 19 is provided with two projecting ear portions 31, and the rake-arm 18 has secured to its rear end a heel-piece 32, that is pivoted therebetween. The heel-piece is provided with a roller 33, adapted to travel upon a cam-track 34, suitably supported by the U-shaped frames, and which guides or controls the movement of the rake-arm in the well-known way. Secured to the head 19 is an upright standard 35, provided with an opening at its upper end that receives an adjustable eyebolt 36, to which is secured one end of a coiled spring 37, that has its opposite end connected, by means of a flexible connection 38, with the heel-piece 32 in a manner to cause the spring 37 to exert its force to yieldingly hold the arm 18 in a downward direction.

The arm 18 is pivotally connected with the rake 17 at one side, and upon the opposite side of the rake is secured the elbow-piece 39, having one arm normally in line and connected with the arm by means of a coiled spring 40 and adjustable eyebolt 40', the force of which is exerted to hold the elbow-arm and rake-arm in the same plane.

The bracket-piece 21 is provided with a portion 41, adapted to receive a sliding detent 42, that engages with the lower end of the spring-pressed lever 27 in a manner to prevent it engaging with the teeth of the wheel 26, as shown in Fig. 3. The detent 42 is pressed upward by means of the coiled spring 43 and is retracted by the link 44, connected to the end of a vibratable lever 45, pivoted below the head and having its opposite end connected to one end of a second vibratable lever 46, pivoted upon the head of the U-shaped frame above the wheel and having its opposite end connected by means of a link with a common form of foot-operated treadle-piece 47, mounted upon the mower-frame.

When a load has been accumulated upon the platform, the operator, by means of the foot-treadle and its conections, draws downward on the detent 42 and releases the lever 27, which is caused to engage with the toothed wheel 26 by means of the spring 27', as shown in Fig. 3. Upon the bracket 21 is a cam portion 48, adapted to engage the lower end of the lever 27 and disengage it from the toothed wheel 26, as shown in Fig. 4, where a section of the lever is shown at different stages of its revolution around the bracket 21.

What I claim as my invention, and desire to secure by Letters Patent, is—

1. In a clover-buncher attachment for mowing-machines, the combination of a trailing slatted platform, the slats having upstanding barbs rigidly attached to their body portions at a distance from their rear ends.

2. In a clover-buncher attachment for mowing-machines, the combination of a trailing slatted platform, the slats having upstanding rearwardly-inclined barbs rigidly attached to their body portions at a distance from their rear ends.

3. In a clover-buncher attachment for mowing-machines, the combination of a trailing slatted platform, the slats having upstanding rearwardly and stubblewardly inclined barbs rigidly attached to their body portions at a distance from their rear ends.

4. In a clover-buncher attachment for mowing-machines, the combination of a trailing quadrant-shaped slatted platform, said slats having upwardly and stubblewardly inclined rear ends and provided with barbs promiscuously arranged at the rear end of the platform.

5. In a clover-buncher attachment for mowing-machines, the combination of a trailing platform adapted to rise and fall as it follows the surface of the ground, a sweep-rake comprising a revolving head, a rake, an arm pivotally connected to said revolving head, a cam adapted to control the movement of said arm, said rake being pivotally connected to said arm, and a spring connection between the arm and head adapted to maintain the rake in operative position relative to said platform, regardless of its rising and falling movement.

6. In a clover-buncher attachment for mowing-machines, the combination of a trailing platform adapted to rise and fall as it follows the surface of the ground, a sweep-rake comprising a revolving head a rake, an arm pivotally connected to said revolving head, a cam adapted to control the movement of said arm, said rake being pivotally connected to said arm, an elbow-piece having one arm secured to one of said rake or arm parts, and the other arm normally parallel with the other part, and a spring operating to maintain said parallelism.

7. In a clover-buncher attachment for mowing-machines, the combination of a trailing platform adapted to rise and fall as it follows the surface of the ground, a sweep-rake comprising a revolving head a rake, a rake-arm pivotally connected to said revolving head, a cam adapted to control the movement of said arm, said rake being pivotally connected to said arm, an elbow-piece having one arm secured to the rake and the other normally parallel with the rake-arm, and a coiled spring having one end connected with the rake-arm and its opposite end attached to the elbow-piece and operating to maintain the parallelism of said rake-arm and elbow member.

8. In a clover-buncher attachment for mowing-machines, the combination of a trailing platform adapted to rise and fall as it follows the surface of the ground, a sweep-rake comprising a revolving head a rake, a rake-arm pivotally connected to said revolving head, a cam adapted to control the movement of said arm, said rake being pivotally connected to said arm, an elbow-piece having one arm secured to the rake and the other normally parallel with the rake-arm, and a coiled spring having one end adjustably connected with the rake-arm and its opposite end attached to the elbow-piece and operating to maintain the parallelism of said rake-arm and elbow member.

9. In a clover-buncher attachment for mowing-machines, the combination of a trailing platform adapted to rise and fall as it follows the surface of the ground, a sweep-rake comprising an arm, a revolving head, said arm pivotally connected to said revolving head, an upright standard secured to said head, a coiled spring having one end secured to the upper end of the standard and its opposite end flexibly connected with the heel of the rake-arm and operative to turn the said arm downward about its pivot.

10. In a clover-buncher attachment for mowing-machines, the combination of a trailing platform adapted to rise and fall as it follows the surface of the ground, a sweep-rake comprising an arm, a revolving head, said arm pivotally connected to said revolving head, an upright standard secured to said head, a coiled spring having one end adjustably secured to the upper end of the standard and its opposite end flexibly connected with the heel of the rake-arm and operative to turn the said arm downward about its pivot.

11. In a clover-buncher attachment and mowing-machine, the combination of a trailing platform in rear of the cutting apparatus, a sweep-rake attachment comprising a bracket suitably mounted upon the grassward end of the driving-axle, a rake-driving shaft journaled in said bracket, a rake-head journaled on said shaft, a rake-arm pivotally connected with said head, a toothed wheel secured to the said rake-driving shaft, means for driving said shaft, and clutch mechanism carried by the rake-head and adapted to engage with said toothed wheel.

12. In a clover-buncher attachment and mowing-machine, the combination of a trailing platform attached to the rear side of the cutting apparatus, a sweep-rake attachment adapted to sweep the accumulated load off the platform, said attachment comprising a bracket suitably mounted upon the grassward end of the driving-axle, a rake-driving shaft journaled in said bracket, a rake-head journaled on said shaft, a rake-arm pivotally connected with said head, a toothed wheel secured to said rake-driving shaft, means for driving said shaft, and clutch mechanism comprising a spring-pressed lever carried by the rake-head and adapted to engage with said toothed wheel.

13. In a clover-buncher attachment and mowing-machine, the combination of a trailing platform attached to the rear side of the cutting apparatus, a sweep-rake adapted to sweep the accumulated load off the platform, said rake attachment comprising a bracket suitably mounted upon the grassward end of the driving-axle, a rake-driving shaft journaled in said bracket, a rake-head journaled on said shaft, a rake-arm pivotally connected with said head, a toothed wheel secured to said rake-driving shaft, means for driving said shaft, a lever pivoted upon the rake-head and adapted to engage with the toothed wheel, and a detent mounted upon the bracket and adapted to hold said lever out of engagement with said toothed wheel.

14. In a clover-buncher attachment and mowing-machine, the combination of a trailing platform attached to the rear side of the cutting apparatus, a sweep-rake attachment adapted to sweep the accumulated load off the platform, said rake attachment comprising a bracket suitably mounted upon the grassward end of the driving-axle, a rake-driving shaft journaled in said bracket, a rake-head journaled on said shaft, a rake-arm pivotally connected with said head, a toothed wheel secured to said rake-driving shaft, means for driving said shaft, a spring-pressed lever pivoted upon the rake-head and adapted to engage with the toothed wheel, means for disengaging said lever from said toothed wheel, a spring-actuated detent slidingly mounted upon the bracket and adapted to engage the clutch-lever and hold it disengaged, and means under the control of the driver for releasing said detent.

15. In a clover-buncher attachment and mowing-machine, the combination of a trailing platform attached to the rear side of the cutting apparatus, a sweep-rake attachment adapted to sweep the accumulated load off the platform, said rake attachment comprising a bracket suitably mounted upon the grassward end of the driving-axle, a rake-driving shaft journaled in said bracket, a rake-head journaled on said shaft, a rake-arm pivotally connected with said head, a toothed wheel secured to said rake-driving shaft, means for driving said shaft, a spring-pressed lever pivoted upon the rake-head and adapted to engage with the toothed wheel, a cam secured to the bracket and adapted to engage with said lever and disengage it from the toothed wheel, a spring-actuated detent mounted upon the bracket and adapted to engage the clutch-lever and hold it disengaged from said toothed wheel, a trip-lever pivotally mounted within reach of the driver, said lever being connected with said detent in a manner to release it at the will of the operator.

In witness whereof I hereto affix my signature in presence of two witnesses.

SAMUEL K. DENNIS.

Witnesses:
ALEXANDER MOXEY,
JOE BODA.